(12) United States Patent
Min et al.

(10) Patent No.: US 9,026,817 B2
(45) Date of Patent: May 5, 2015

(54) JOINT OPTIMIZATION OF PROCESSOR FREQUENCIES AND SYSTEM SLEEP STATES

(75) Inventors: Alexander W. Min, Portland, OR (US); Ren Wang, Portland, OR (US); Jr-Shian Tsai, Portland, OR (US); Mesut A. Ergin, Portland, OR (US); Tsung-Yuan C. Tai, Portland, OR (US); Andrew D. Henroid, Portland, OR (US); Ashish V. Choubal, Austin, TX (US); Bruce L. Fleming, Morgan Hill, CA (US)

(73) Assignee: Intel Corporation, Santa Clara, CA (US)

( * ) Notice: Subject to any disclaimer, the term of this patent is extended or adjusted under 35 U.S.C. 154(b) by 210 days.

(21) Appl. No.: 13/538,103

(22) Filed: Jun. 29, 2012

(65) Prior Publication Data

US 2014/0006819 A1    Jan. 2, 2014

(51) Int. Cl.
*G06F 1/32* (2006.01)
*G06F 1/00* (2006.01)

(52) U.S. Cl.
CPC .............. *G06F 1/324* (2013.01); *Y02B 60/1217* (2013.01); *Y02B 60/32* (2013.01)

(58) Field of Classification Search
CPC ..................................................... G06F 1/3203
USPC ......................................................... 713/320
See application file for complete search history.

(56) References Cited

U.S. PATENT DOCUMENTS

| | | | |
|---|---|---|---|
| 7,131,016 B2* | 10/2006 | Oh et al. | 713/322 |
| 7,512,820 B2* | 3/2009 | Flautner et al. | 713/320 |
| 7,761,874 B2* | 7/2010 | Bodas | 718/100 |
| 8,185,758 B2* | 5/2012 | Henroid et al. | 713/300 |
| 8,650,423 B2* | 2/2014 | Li et al. | 713/322 |
| 2010/0146316 A1 | 6/2010 | Carter et al. | |
| 2011/0113269 A1* | 5/2011 | Park | 713/310 |
| 2011/0264938 A1* | 10/2011 | Henroid et al. | 713/323 |
| 2012/0066526 A1 | 3/2012 | Salsbery et al. | |
| 2012/0233488 A1* | 9/2012 | Burchard et al. | 713/500 |
| 2013/0138985 A1 | 5/2013 | Wang et al. | |
| 2013/0283032 A1 | 10/2013 | Therien et al. | |
| 2014/0258749 A1 | 9/2014 | Wamg et al. | |

FOREIGN PATENT DOCUMENTS

| | | |
|---|---|---|
| KR | 10-2007-0003989 A | 1/2007 |
| KR | 10-2011-0034729 A | 4/2011 |
| WO | 2014/004401 A1 | 1/2014 |

OTHER PUBLICATIONS

International Search Report and Written Opinion received for PCT Patent Application No. PCT/US2013/047402, mailed on Sep. 27, 2013, 10 pages.

* cited by examiner

*Primary Examiner* — Suresh Suryawanshi
(74) *Attorney, Agent, or Firm* — Jordan IP Law, LLC

(57) ABSTRACT

Systems and methods may provide for identifying a workload cycle for a computing platform, wherein the workload cycle is to include a busy duration and an idle duration. Additionally, platform energy consumption information may be determined for the workload cycle, and a frequency setting may be selected for the busy duration based at least in part on the platform energy consumption information.

30 Claims, 4 Drawing Sheets

JOINT OPTIMIZATION OF PROCESSOR FREQUENCIES AND SYSTEM SLEEP STATES

BACKGROUND

1. Technical Field

Embodiments generally relate to power management in computing platforms. More particularly, embodiments relate to the joint optimization of processor frequencies and system sleep states to enhance power management.

2. Discussion

Conventional computing platforms may enter platform low power states during periods of idleness in order to reduce power consumption. Additionally, during intervening periods of activity, platform processors may be configured to operate at the lowest frequency permitted by performance requirements to further conserve power. Operating a platform processor at a lower frequency, however, may result in the processor taking longer to complete its workload, wherein the extend periods of processor activity can reduce the periods of idleness for the platform. Moreover, the reduced periods of platform idleness may lead to shallower platform low power states and suboptimal power consumption.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
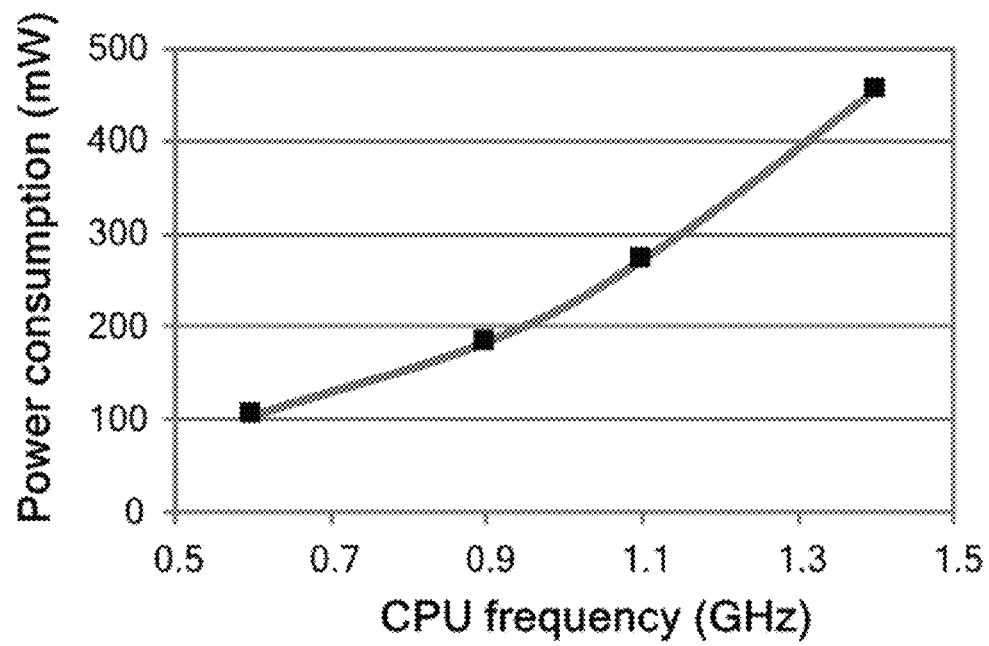
FIG. 1 is plot of an example of a power consumption curve according to an embodiment.

In general, processor performance state (P-state, e.g., Advanced Configuration and Power Interface/ACPI Specification, Rev. 4.0a, Apr. 5, 2010) selection may be used to achieve different operational profiles with regard to platform processors. More particularly, different processor P-states may implement different frequency settings, wherein higher frequencies can result in higher power consumption and better performance. FIG. 1 shows a processor power consumption curve 10 for a set of processor frequency setting candidates ranging from 600 MHz to 1400 Mhz. In the illustrated example, a processor frequency increase by a factor of 2.33 (from 600 MHz to 1400 Mhz) results in a processor power consumption increase by a factor of 4.33. Thus, the processor power consumption may grow "super-linearly" with increasing frequency (i.e., $P_{processor} \sim Cf^2V$, where C is capacitance, f is the frequency setting, and V is voltage). Therefore, from a processor energy efficiency point of view, it might appear to be optimal to operate the processor at the lowest possible frequency unless a higher frequency is required to meet a certain platform performance need.

Figure 2:
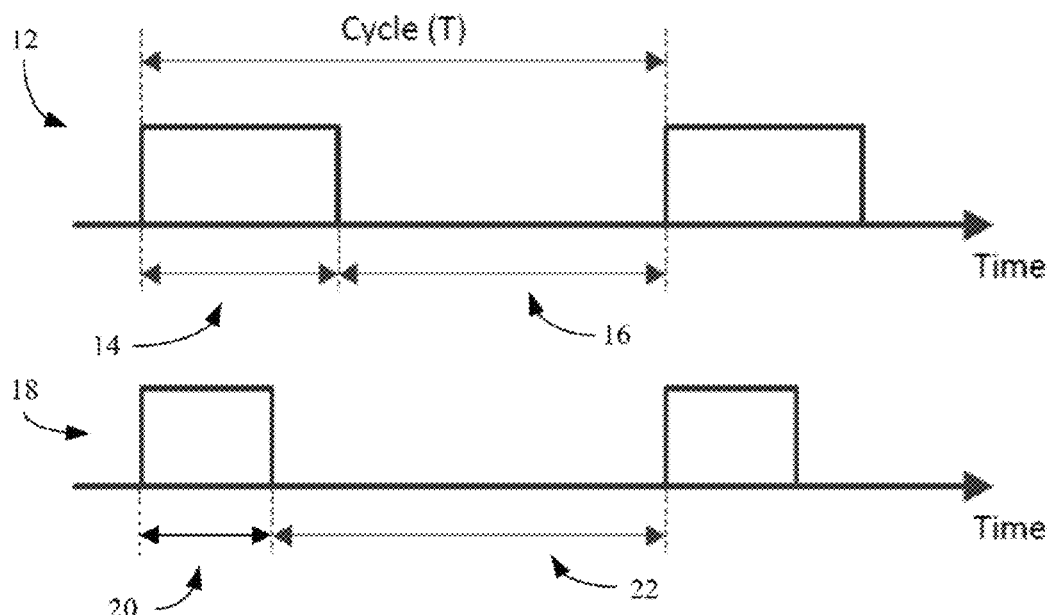
FIG. 2 are plots of examples of workload cycle profiles according to embodiments.

Turning now to FIG. 2, a pair of workload cycle profiles is shown for a computing platform having a cycle of duration "T". In the illustrated example, a first profile 12 corresponds to a scenario in which a relatively low frequency setting is applied to a platform processor. The result may be a busy duration 14 (e.g., $T_b$ or "active window") during which the processor handles its assigned workload, and an idle duration 16 ($T_i$ or "active idle window") during which the processor waits for the next batch of instructions and the platform enters a particular sleep state. Thus, the illustrated cycle could correspond to, for example, a wireless communications-involved mobile workload such as a YouTube® stream in which the processor repeatedly wakes up, processes bursts of incoming packets, and then enters a low power sleep state.

A second profile 18, on the other hand, may correspond to a scenario in which a relatively high frequency setting is applied to the platform processor for the same workload. In such a case, a busy duration 20 may be shorter because the processor completes its instruction processing responsibilities sooner. Accordingly, an idle duration 22 of the platform is longer, in the illustrated example. As will be discussed in greater detail, the longer idle duration 22 may provide an opportunity for the platform to enter a deeper sleep state, wherein the power savings of the deeper sleep state can outweigh the increased power consumption associated with operating the processor at a higher frequency setting.

Figure 3:
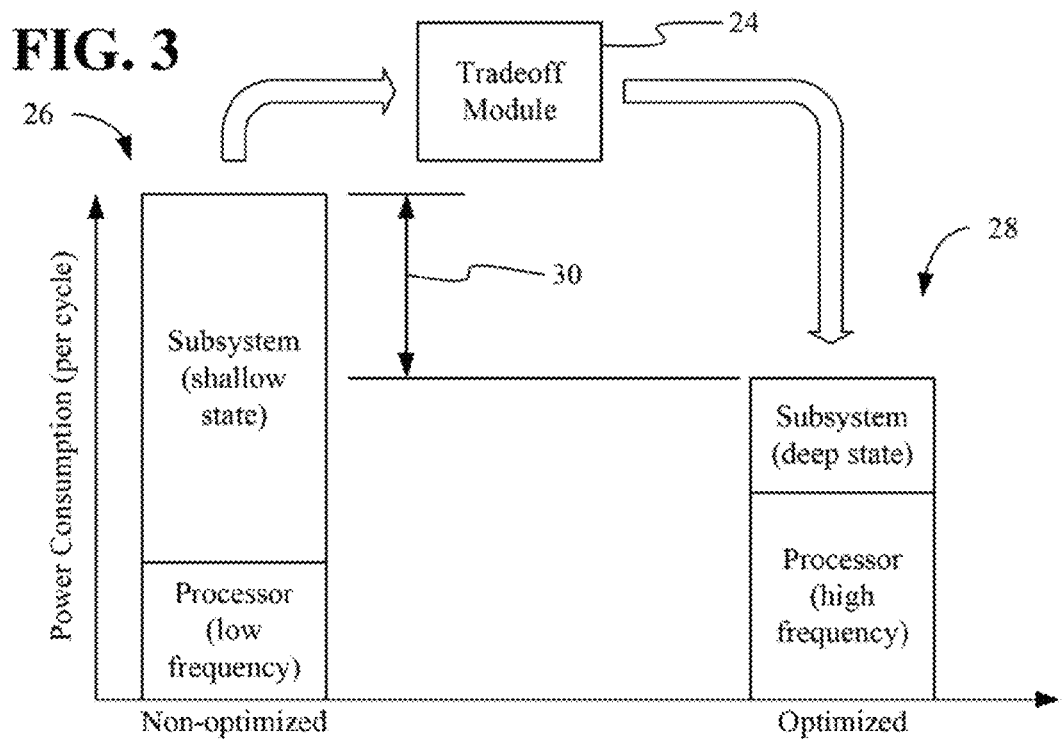
FIG. 3 is a block diagram of an example of a joint optimization scheme according to an embodiment.

FIG. 3 shows a power management scheme in which a tradeoff module 24 can transform a non-optimized state 26 of a computing platform into an optimized state 28. In the illustrated example, rather than applying a relatively low frequency setting to one or more processors on the platform, the tradeoff module 24 operates the processors at a higher frequency, which enables the platform to enter a deeper sleep state and achieve significant power savings 30. Thus, although the processor power consumption may be greater in the optimized state 28, the overall power consumption can be reduced due to the increased idle duration and deeper sleep state resulting from the higher processor frequency.

Simply put, both processor P-states and platform sleep states may be dynamically selected to minimize platform power consumption. In particular, for a given workload, total platform power consumption can be defined as a sum of the power consumption of the processor and the subsystems (e.g., other platform components), i.e., $$P = P_{cpu} + P_{sub}. \tag{1}$$

Assuming the total length of one cycle is T, the busy time/duration is $T_b$, and the idle time is $T_i$, where $T = T_b + T_i$, the energy consumption during one cycle may be expressed as follows:

$$E = P_{busy} * T_b + P_{idle} * T_i, \tag{2}$$

where $P_{busy} = P_{cpu\_busy} + P_{sub\_busy}$ and $P_{idle} = P_{cpu\_idle} + P_{sub\_idle}$. Note that, the subsystem idle power consumption, $P_{sub\_idle}$, may be determined by the particular platform sleep state entered during the idle duration. For example, to be able to save platform power by entering a particular sleep state "S", the idle duration may need to exceed the target residency of the state S. Table I below depicts typical target residency values that might be used for the ACPI sleep states of a computing platform.

TABLE I

| Sleep state | Target residency (µs) |
|---|---|
| C1 | 4 |
| C2 | 80 |
| C4 | 400 |
| C6 | 560 |

TABLE I-continued

| Sleep state | Target residency (μs) |
|---|---|
| S0i1 | 2080 |
| S0i3 | 25038 |

In formula (2), the expected energy consumption, E, is a function of processor frequency, among other parameters such as platform idle power, break-even time, etc. With a higher frequency, $P_{busy}$ may be higher due to higher processor power consumption. However, $T_b$ could be potentially lower since the execution of the workload may be completed in shorter time. Accordingly, a longer idle time may occur within one cycle. The platform can take advantage of the longer idle duration by entering a deeper sleep state and staying there for a longer period of time.

Therefore, there may be a clear tradeoff between processor and platform power consumption; the higher the processor frequency, potentially the higher the processor power consumption depending on the workload scalability, but potentially lower the platform power consumption due to the extended platform idle duration. The techniques described herein can minimize the expected platform energy consumption E by optimizing both the processor P-state and the sleep state dynamically at run-time. The optimal sleep state may depend on the upcoming idle duration, which can in turn depend on the processor P-state, the workload scalability, and the workload busy duration $T_b$ (under a reference processor frequency $f_1$).

For example, for a completely processor bound workload (e.g., requiring no input/output to/from memory), $T_b \sim (1/f)$ (e.g., the increase of frequency may reduce the active window proportionally). On the contrary, for a completely memory bound workload, $T_b$ may remain the same independent of the processor frequency. Most workloads may fall between these two extremes. In this regard, a scalability factor can be calculated at run-time, based on memory stall and processor execution counters, or by heuristically monitoring the workload response to the processor frequency change. Assuming the scalability factor, "s", holds $0 <= s <= 1$, then the busy duration $T_b$ (i.e., active window) can be calculated as:

$$T_b(f_n) = T_b(f_1)*(1-s) + T_b(f_1)*s*f_1/f_n, n=1, \ldots, N. \quad (3)$$

From $T_b(f_n)$ in formula (3), the expected platform idle duration can be calculated as $T_i(f_n) = T - T_b(f_n)$. By comparing the expected idle duration $T_i(f_n)$ and the energy break-even time for the available sleep states, a suggested/optimal sleep state can be determined that minimizes the total energy $E[f_n]$ for a given P-state ($f_n$). Moreover, the expected energy consumption for all available P-states and the corresponding optimal sleep states may be determined.

Figure 4:
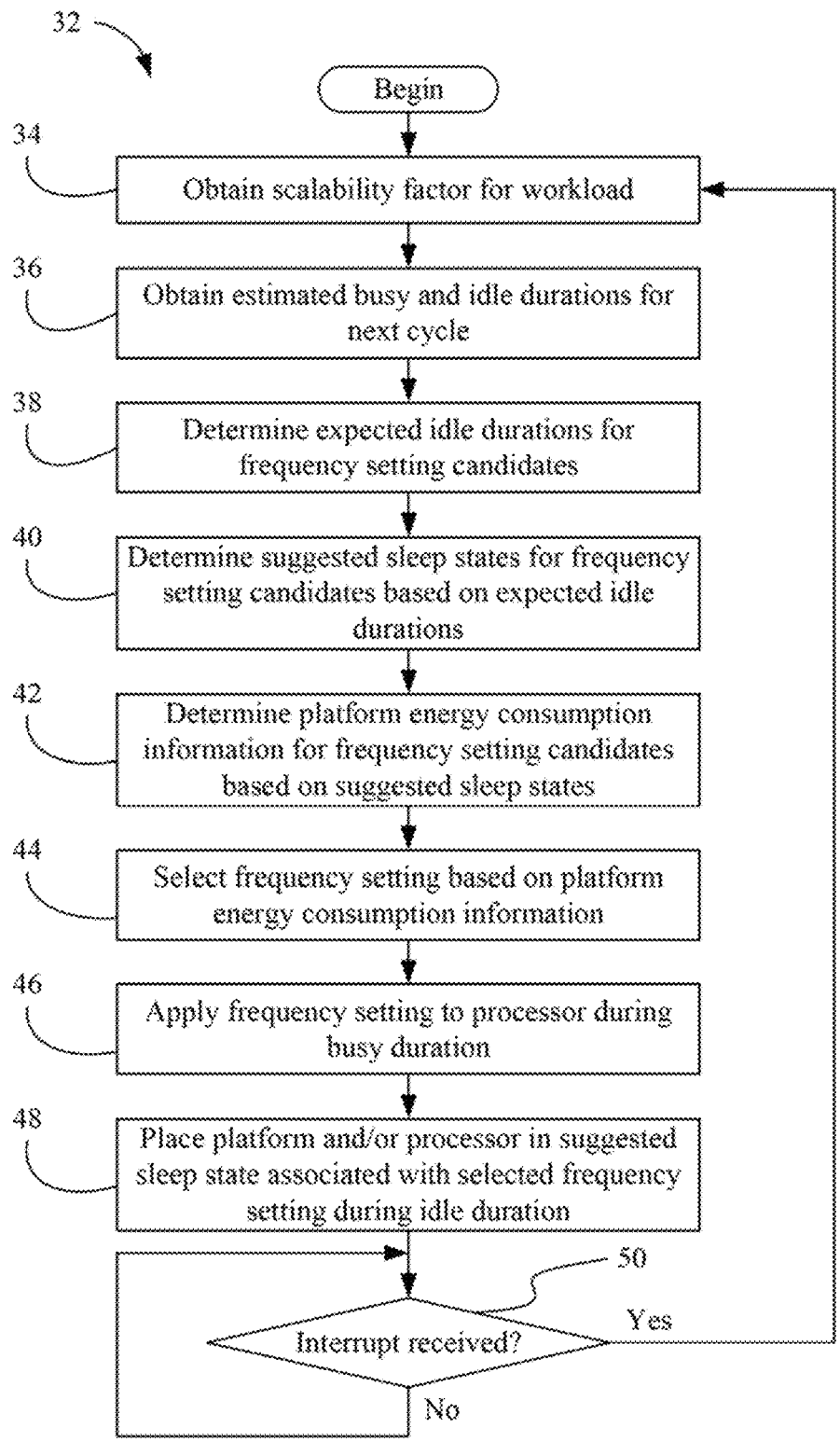
FIG. 4 is a flowchart of an example of a method of conducting power management for a computing platform according to an embodiment.

In particular, FIG. 4 shows a method 32 of conducting power management in a computing platform. The method 32 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 34 provides for obtaining a scalability factor for a workload. As already noted, the scalability factor may reflect a scalability range between a processor bound workload and a memory bound workload, wherein the scalability factor could be determined based on memory stall and processor execution counter values, a heuristic workload response to one or more frequency setting changes, and so forth. Estimated busy and idle durations may be determined for the next cycle at block 36, wherein illustrated block 38 determines idle durations for a set of frequency setting candidates (e.g., P-state frequencies). Thus, block 38 may involve calculating an expected idle duration $T_i$ for each $f_n$, wherein $n=1, \ldots, N$. As already noted, the idle durations may be determined based on, for example, the scalability factor determined in block 34. Suggested sleep states can also be determined for the set of frequency setting candidates at block 40 based at least in part on the idle durations. Therefore, block 40 may involve using each $T_i$ from block 38 to select an optimal sleep state $S^*(f_n)$ for each $f_n$, wherein $n=1, \ldots, N$. As also already noted, the suggested sleep states may be determined based on energy break even times.

Figure 5:
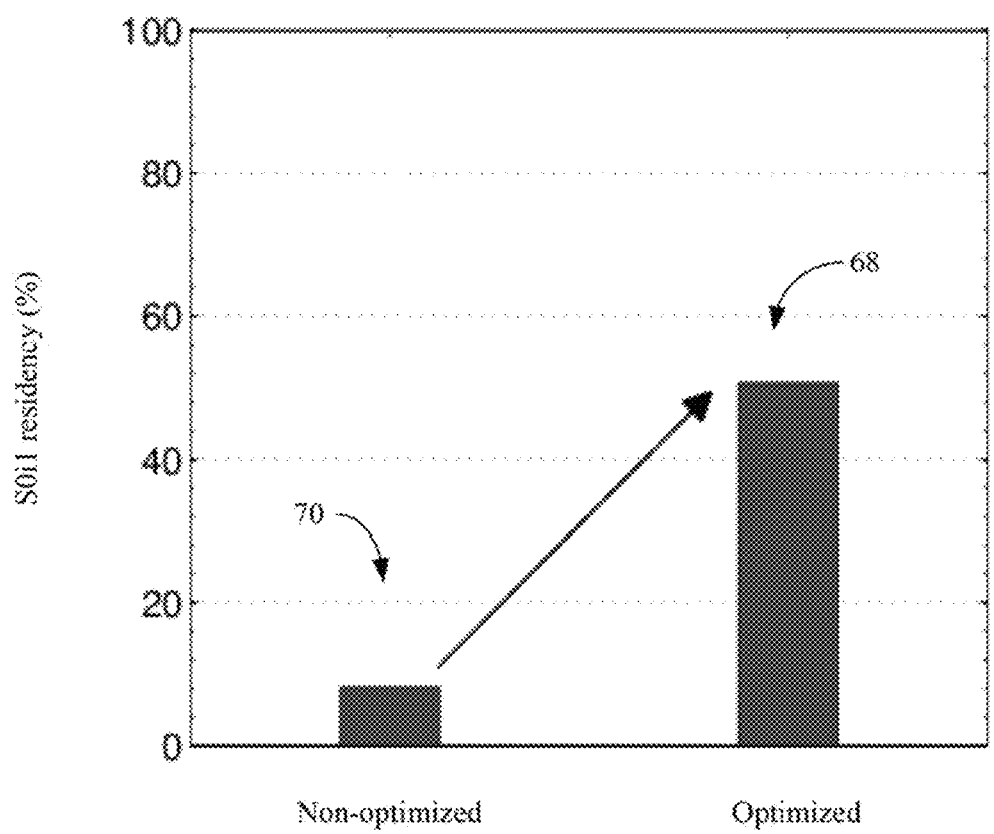
FIG. 5 is a graph of an example of sleep state residency according to an embodiment.

Illustrated block 42 determines platform energy consumption information for the workload cycle based on the suggested sleep states. Accordingly, block 42 might involve using each suggested sleep state $S^*(f_n)$ to calculate the expected platform energy consumption for each $f_n$, wherein $n=1, \ldots, N$ as discussed above with regard to formula (2). A frequency setting can be selected at block 44 based on the platform energy consumption information. In one example, the selected frequency setting corresponds to minimum platform energy consumption value, namely, $f^* = \text{argmin } E[f_n]$. Of particular note is that the selected frequency setting may be greater than the lowest available frequency setting. The selected frequency setting can be applied to one or more platform processors at block 46 during the busy duration of the workload cycle, wherein the platform and/or processor may be placed in the suggested sleep state associated with the selected frequency setting at block 48 during the idle duration of the workload cycle. Block 50 may check for any interrupts that would be indicative of new workload instructions (e.g., the end of the idle duration). FIG. 5 demonstrates that an optimized residency 68 in a relatively deep platform sleep state (e.g., S0i1) may represent an increase by a factor of six over a non-optimized residency 70 in the same sleep state, using the techniques described herein.

Figure 6:
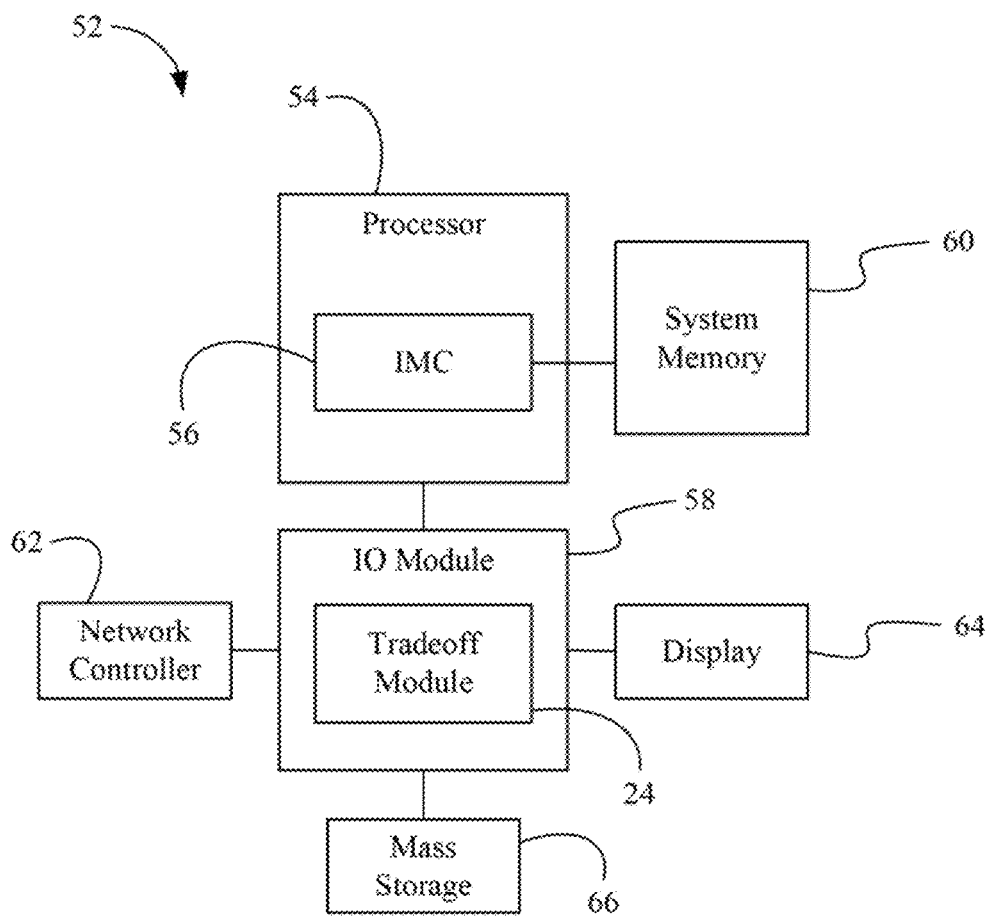
FIG. 6 is a block diagram of an example of a computing platform according to an embodiment.

Turning now to FIG. 6, a platform 52 is shown. The platform 52 may be, for example, part of a mobile device having computing functionality (e.g., personal digital assistant/PDA, laptop, smart tablet), communications functionality (e.g., wireless smart phone), imaging functionality, media playing functionality (e.g., smart television/TV), or any combination thereof (e.g., mobile Internet device/MID). In the illustrated example, the platform 52 includes a processor 54, an integrated memory controller (IMC) 56, an input/output (IO) module 58, system memory 60, a network controller (e.g., network interface card) 62, a display 64 and mass storage 66. In general, the processor 54 may be capable of being operated at various different frequencies (e.g., P-states), wherein the platform 52 and/or processor 54 may also be capable of being placed in various different sleep states.

The illustrated IO module 58, sometimes referred to as a Southbridge or South Complex of a chipset, functions as a host controller and communicates with the network controller 62, which could provide off-platform communication functionality for a wide variety of purposes such as, for example, cellular telephone (e.g., W-CDMA (UMTS), CDMA2000

(IS-856/1S-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. Thus, the workload handled by the processor 54 may include periodic bursts of communications related incoming and outgoing packets, wherein the platform 52 and/or processor 54 may be placed in sleep states in between packet bursts.

Accordingly, the IO module 58 may include a tradeoff module/logic 24 configured to identify a workload cycle for the platform 52, wherein the workload cycle is to include a busy duration and an idle duration, determine platform energy consumption information for the workload cycle, and select a frequency setting for the busy duration based at least in part on the platform energy consumption information, as already noted. The tradeoff module 24 may also apply the selected frequency setting to the processor 54 during the busy duration and place the platform 52 and/or processor 54 in an optimal sleep state associated with the selected frequency setting during the idle duration. The tradeoff module 24 could be implemented elsewhere on the platform 52 such as, for example, in the processor 54 as embedded logic, as instructions retrieved from either the system memory 60 or mass storage 66 and executed in the processor 54 and/or IO module 58, or any combination thereof.

As already noted, P-state selection can be implemented within platform firmware/software, etc. For example, a lookup table could be built that matches given workload characteristics (i.e., scalability, active time window, cycle) to an optimal P-state. The system may then simply adjust the P-state based on the current workload characteristics. On the other hand, the P-state selection can also be implemented to evaluate the optimal states online (e.g., via real-time estimation), at a potential expense of increased computational cost. Although the examples used herein may have focused on processor P-state optimization, these techniques can be applied to other devices/components (e.g., graphics processing unit/GPU frequency optimization).

Embodiments may therefore provide for a method in which a workload cycle is identified for a platform, wherein the workload cycle includes a busy duration and an idle duration. The method can also involve determining platform energy consumption information for the workload cycle and selecting a frequency setting for the busy duration based at least in part on the platform energy consumption information.

Embodiments may also include an apparatus having logic to identify a workload cycle for a platform, wherein the workload cycle is to include a busy duration and an idle duration. The logic can also determine platform energy consumption information for the workload and select a frequency setting for the busy duration based at least in part on the platform energy consumption information.

Embodiments may also include a computing platform having a processor, a network controller to provide a workload for the processor, and logic to identify a workload cycle for the platform, wherein the workload cycle is to include a busy duration and an idle duration. The logic can also determine platform energy consumption information for the workload cycle, and select a frequency setting for the busy duration based at least in part on the platform energy consumption information.

Additionally, embodiments can include a non-transitory computer readable storage medium having a set of instructions which, if executed by a platform, cause the platform to identify a workload cycle for the platform, wherein the workload cycle is to include a busy duration and an idle duration. The instructions, if executed, may also cause the platform to determine platform energy consumption information for the workload cycle, and select a frequency setting for the busy duration based at least in part on the platform energy consumption information.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. An apparatus comprising:
   logic to,
   identify a workload cycle for a platform, wherein the workload cycle is to include a busy duration and an idle duration, the busy duration being calculable according to the equation $$T_b(f_n) = +T_b(f_1)*(1-s) + T_b(f_1)*s*f_1/f_n, n=1, \ldots, N$$

where $T_b$ is a busy duration, $f_n$ is a frequency corresponding to a processor state n and n may vary between 1 and N processor states, and s is a scalability factor,
   determine platform energy consumption information for the workload cycle, and
   select a frequency setting for the busy duration based at least in part on the platform energy consumption information.

2. The apparatus of claim 1, wherein the logic is to,
   determine idle durations for a set of frequency setting candidates, and
   determine suggested sleep states for the set of frequency setting candidates based at least in part on the idle durations, wherein the platform energy consumption information is to be determined for the set of frequency setting candidates based at least in part on the suggested sleep states.

3. The apparatus of claim 1, wherein the idle durations are to be determined based at least in part on a scalability factor.

4. The apparatus of claim 3, wherein the scalability factor is to reflect a scalability range between a processor bound workload and a memory bound workload.

5. The apparatus of claim 3, wherein the logic is to determine the scalability factor based at least in part on one or more of memory stall counter values and processor execution counter values.

6. The apparatus of claim 3, wherein the logic is to determine the scalability factor based at least in part on a heuristic workload response to one or more frequency setting changes.

7. The apparatus of claim 1, wherein the suggested sleep states are to be determined further based on energy break even times.

8. The apparatus of claim 1, wherein the logic is to apply the frequency setting to the processor during the busy duration.

9. The apparatus of claim 1, wherein the frequency setting is to be greater than a lowest available frequency setting.

10. The apparatus of claim 1, wherein the logic is to place one or more of the platform and the processor in a suggested sleep state associated with the frequency setting during the idle duration.

11. A computing platform comprising:
    a processor;
    a network controller to provide a workload for the processor; and
    logic to,
    identify a workload cycle for the platform, wherein the workload cycle is to include a busy duration and an idle duration, the busy duration being calculable according to the equation $$T_b(f_n) = +T_b(f_1)*(1-s) + T_b(f_1)*s*f_1/f_n, n=1, \ldots, N$$

where $T_b$ is a busy duration, $f_n$ is a frequency corresponding to a processor state n and n may vary between 1 and N processor states, and s is a scalability factor,
    determine platform energy consumption information for the workload cycle, and
    select a frequency setting for the busy duration based at least in part on the platform energy consumption information.

12. The platform of claim 11, wherein the logic is to,
    determine idle durations for a set of frequency setting candidates, and
    determine suggested sleep states for the set of frequency setting candidates based at least in part on the idle durations, wherein the platform energy consumption information is to be determined for the set of frequency setting candidates based at least in part on the suggested sleep states.

13. The platform of claim 12, wherein the idle durations are to be determined based at least in part on a scalability factor.

14. The platform of claim 13, wherein the scalability factor is to reflect a scalability range between a processor bound workload and a memory bound workload.

15. The platform of claim 13, wherein the logic is to determine the scalability factor based at least in part on one or more of memory stall counter values and processor execution counter values.

16. A method comprising:
    identifying a workload cycle for a platform, wherein the workload cycle includes a busy duration and an idle duration, the busy duration being calculable according to the equation $$T_b(f_n) = +T_b(f_1)*(1-s) + T_b(f_1)*s*f_1/f_n, n=1, \ldots, N$$

where $T_b$ is a busy duration, $f_n$ is a frequency corresponding to a processor state n and n may vary between 1 and N processor states, and s is a scalability factor;
    determining platform energy consumption information for the workload cycle; and
    selecting a frequency setting for the busy duration based at least in part on the platform energy consumption information.

17. The method of claim 16, wherein determining the platform energy consumption information includes:
    determining idle durations for a set of frequency setting candidates; and
    determining suggested sleep states for the set of frequency setting candidates based at least in part on the idle durations, wherein the platform energy consumption information is determined for the set of frequency setting candidates based at least in part on the suggested sleep states.

18. The method of claim 16, wherein the idle durations are determined based at least in part on a scalability factor.

19. The method of claim 18, wherein the scalability factor reflects a scalability range between a processor bound workload and a memory bound workload.

20. The method of claim 18, further including determining the scalability factor based at least in part on one or more of memory stall counter values and processor execution counter values.

21. A non-transitory computer readable storage medium comprising a set of instructions which, if executed by a platform, cause the platform to:
    identify a workload cycle for the platform, wherein the workload cycle is to include a busy duration and an idle duration, the busy duration being calculable according to the equation $$T_b(f_n) = +T_b(f_1)*(1-s) + T_b(f_1)*s*f_1/f_n, n=1, \ldots, N$$

where $T_b$ is a busy duration, $f_n$ is a frequency corresponding to a processor state n and n may vary between 1 and N processor states, and s is a scalability factor;

determine platform energy consumption information for the workload cycle; and select a frequency setting for the busy duration based at least in part on the platform energy consumption information.

22. The medium of claim 21, wherein the instructions, if executed, cause the platform to:

determine idle durations for a set of frequency setting candidates; and determine suggested sleep states for the set of frequency setting candidates based at least in part on the idle durations, wherein the platform energy consumption information is to be determined for the set of frequency setting candidates based at least in part on the suggested sleep states.

23. The medium of claim 22, wherein the idle durations are to be determined based at least in part on a scalability factor.

24. The medium of claim 23, wherein the scalability factor is to reflect a scalability range between a processor bound workload and a memory bound workload.

25. The medium of claim 23, wherein the instructions, if executed, cause the platform to determine the scalability factor based at least in part on one or more of memory stall counter values and processor execution counter values.

26. The medium of claim 23, wherein the instructions, if executed, cause the platform to determine the scalability factor based at least in part on a heuristic workload response to one or more frequency setting changes.

27. The medium of claim 22, wherein the suggested sleep states are to be determined further based on energy break even times.

28. The medium of claim 21, wherein the instructions, if executed, cause the platform to apply the frequency setting to a processor on the platform during the busy duration.

29. The medium of claim 21, wherein the frequency setting is to be greater than a lowest available frequency setting.

30. The medium of claim 21, wherein the instructions, if executed, cause the platform to place one or more of itself and a processor on the platform in a suggested sleep state associated with the frequency setting during the idle duration.

* * * * *